(12) United States Patent
McGuffie

(10) Patent No.: US 11,369,861 B2
(45) Date of Patent: Jun. 28, 2022

(54) SERVICE VEHICLE AND MANAGEMENT SYSTEM

(71) Applicant: FLEET (LINE MARKERS) LIMITED, Malvern (GB)

(72) Inventor: Iain McGuffie, Bromyard (GB)

(*) Notice: Subject to any disclaimer, the term of this patent is extended or adjusted under 35 U.S.C. 154(b) by 483 days.

(21) Appl. No.: 16/347,482

(22) PCT Filed: Nov. 3, 2017

(86) PCT No.: PCT/EP2017/078256
§ 371 (c)(1),
(2) Date: May 3, 2019

(87) PCT Pub. No.: WO2018/083279
PCT Pub. Date: May 11, 2018

(65) Prior Publication Data
US 2019/0282889 A1    Sep. 19, 2019

(30) Foreign Application Priority Data
Nov. 3, 2016 (GB) ...................... 1618575

(51) Int. Cl.
*G05D 1/00* (2006.01)
*A63C 19/06* (2006.01)
(Continued)

(52) U.S. Cl.
CPC .......... *A63C 19/065* (2013.01); *A01B 69/008* (2013.01); *G01C 15/04* (2013.01);
(Continued)

(58) Field of Classification Search
CPC .................................................. A63C 19/065
See application file for complete search history.

(56) References Cited

U.S. PATENT DOCUMENTS 6,719,467 B2 * 4/2004 Hess ........................ B41J 3/407
400/70
7,029,199 B2 * 4/2006 Mayfield ................ A63C 19/06
404/93
(Continued)

FOREIGN PATENT DOCUMENTS

CN    101379450 A    3/2009
WO    2010039203 A1    4/2010
(Continued)

*Primary Examiner* — Jonathan M Dager
(74) *Attorney, Agent, or Firm* — Jacob M. Ward; Ward Law Office LLC

(57) ABSTRACT

A service vehicle with service equipment for performing a predetermined service operation in an operating area, the vehicle comprising positioning means to determine position information for navigating the service vehicle and/or the service equipment; monitoring means to acquire position-dependent operational data of the performing of the service operation in dependence on the position information; and reporting means to communicate the position-dependent operational data to a remote management server. The service vehicle is operable in a first mode, in which the positioning means provides the position information to the monitoring means which acquires the position-dependent operational data using the position information; the reporting means communicates the operational data to the remote management server; and the navigating is performed substantially independently of the position information.

15 Claims, 3 Drawing Sheets

(51) Int. Cl.
*G05D 1/02* (2020.01)
*G01C 15/04* (2006.01)
*A01B 69/04* (2006.01)

(52) U.S. Cl.
CPC ......... *G05D 1/0276* (2013.01); *G05D 1/0282* (2013.01); *A63C 2019/067* (2013.01); *G05D 1/0278* (2013.01); *G05D 2201/0201* (2013.01); *G05D 2201/0202* (2013.01)

(56) References Cited

U.S. PATENT DOCUMENTS

| | | | | |
|---|---|---|---|---|
| 7,981,462 | B2 * | 7/2011 | Bustgens | B05C 5/027 427/256 |
| 8,204,654 | B2 * | 6/2012 | Sachs | A01B 79/005 702/155 |
| 8,596,217 | B2 * | 12/2013 | Kipfer | G05D 1/0236 118/712 |
| 8,666,550 | B2 * | 3/2014 | Anderson | A01D 75/185 700/255 |
| 8,758,076 | B1 * | 6/2014 | Austin | A63H 13/15 446/454 |
| 8,886,384 | B2 * | 11/2014 | Chung | A01D 34/008 701/25 |
| 8,935,091 | B2 * | 1/2015 | Davis | B44C 3/00 404/93 |
| 9,008,918 | B2 * | 4/2015 | Missotten | A01B 69/00 701/50 |
| 9,043,951 | B2 * | 6/2015 | Tolstedt | G05D 1/021 |
| 9,258,942 | B2 * | 2/2016 | Biber | A01D 34/008 |
| 9,528,228 | B2 * | 12/2016 | Allega | B05B 13/005 |
| 9,598,826 | B2 * | 3/2017 | Grimm | E01C 23/222 |
| 9,784,843 | B2 * | 10/2017 | Dolinar | E01C 23/163 |
| 9,888,625 | B2 * | 2/2018 | Yamamura | A01D 34/008 |
| 10,029,368 | B2 * | 7/2018 | Wolowelsky | G05D 1/0246 |
| 10,222,797 | B2 * | 3/2019 | Yamamura | G05D 1/0278 |
| 10,643,377 | B2 * | 5/2020 | Grufman | G06F 3/04845 |
| 10,773,174 | B1 * | 9/2020 | Mullin | A63C 19/065 |
| 10,906,179 | B2 * | 2/2021 | Nguyen | G05D 1/0244 |
| 2003/0018423 | A1 * | 1/2003 | Saller | A01C 21/00 701/50 |
| 2003/0168834 | A1 * | 9/2003 | Ulrich | E01C 23/222 280/727 |
| 2004/0057795 | A1 * | 3/2004 | Mayfield | A63C 19/08 404/84.05 |
| 2005/0038578 | A1 * | 2/2005 | McMurtry | A01B 79/005 701/25 |
| 2008/0049217 | A1 * | 2/2008 | Cappelletti | A01D 34/008 356/141.3 |
| 2008/0183349 | A1 * | 7/2008 | Abramson | A01D 34/008 901/30 |
| 2009/0055004 | A1 * | 2/2009 | Davis | B44C 1/222 700/90 |
| 2009/0205566 | A1 * | 8/2009 | McGuffie | A63C 19/08 118/664 |
| 2010/0095545 | A1 * | 4/2010 | Miller | B43L 13/00 33/759 |
| 2011/0039021 | A1 * | 2/2011 | Persson | A63C 19/065 901/1 |
| 2011/0142099 | A1 * | 6/2011 | Poncelet born Morey | G05D 1/0225 375/147 |
| 2011/0166701 | A1 * | 7/2011 | Thacher | A01G 25/00 700/245 |
| 2011/0166705 | A1 * | 7/2011 | Anderson | A01D 34/008 901/50 |
| 2011/0167574 | A1 * | 7/2011 | Stout | G05D 1/0257 701/25 |
| 2011/0295424 | A1 * | 12/2011 | Johnson | G05D 1/0274 700/248 |
| 2012/0158236 | A1 * | 6/2012 | Chung | A01D 34/008 701/25 |
| 2012/0212638 | A1 * | 8/2012 | Schepelmann | G06V 10/449 348/222.1 |
| 2012/0265391 | A1 * | 10/2012 | Letsky | G05D 1/0221 701/25 |
| 2013/0184924 | A1 * | 7/2013 | Jagenstedt | B60L 15/20 901/1 |
| 2013/0190981 | A1 | 7/2013 | Dolinar et al. | |
| 2013/0236644 | A1 * | 9/2013 | Logan | B05D 1/02 118/313 |
| 2013/0282224 | A1 * | 10/2013 | Yazaki | G05D 1/0219 701/24 |
| 2013/0333342 | A1 * | 12/2013 | Keski-Luopa | A01D 43/14 56/10.2 A |
| 2014/0076985 | A1 * | 3/2014 | Pettersson | B05B 12/122 239/11 |
| 2014/0106066 | A1 * | 4/2014 | McGuffie | A63C 19/065 427/137 |
| 2015/0296707 | A1 * | 10/2015 | Fukuda | A01B 69/008 701/25 |
| 2016/0157422 | A1 * | 6/2016 | Köhler | A01G 25/09 700/275 |
| 2016/0165795 | A1 * | 6/2016 | Balutis | G05D 1/0265 701/25 |
| 2016/0174459 | A1 * | 6/2016 | Balutis | G05D 1/0221 701/25 |
| 2017/0020064 | A1 * | 1/2017 | Doughty | A01D 34/008 |
| 2017/0079202 | A1 * | 3/2017 | Balutis | G05D 1/0234 |
| 2017/0150676 | A1 * | 6/2017 | Yamauchi | G05D 1/0221 |
| 2017/0372514 | A1 * | 12/2017 | Grufman | G06F 3/04815 |
| 2018/0035606 | A1 * | 2/2018 | Burdoucci | H04N 5/232935 |
| 2018/0116105 | A1 * | 5/2018 | Balutis | G05D 1/0234 |
| 2018/0292827 | A1 * | 10/2018 | Artes | G05D 1/0088 |
| 2018/0307242 | A1 * | 10/2018 | Sørensen | E01C 23/222 |
| 2018/0356521 | A1 * | 12/2018 | Mcguffie | G01C 15/06 |
| 2019/0141888 | A1 * | 5/2019 | Balutis | B25J 9/0081 701/25 |
| 2020/0154632 | A1 * | 5/2020 | Chen | G05D 1/0278 |
| 2020/0173784 | A1 * | 6/2020 | Chang | G05D 1/0219 |

FOREIGN PATENT DOCUMENTS

| | | |
|---|---|---|
| WO | 2014013416 A2 | 1/2014 |
| WO | 2016076320 A1 | 5/2016 |

* cited by examiner

SERVICE VEHICLE AND MANAGEMENT SYSTEM

FIELD OF THE INVENTION

The invention relates to the field of remote management of a service vehicle, or equipment carried by the vehicle, as a function of the location of the vehicle or its equipment. In particular, but not exclusively, the invention can be applied to semi-autonomous line-marking machines for sports fields.

BACKGROUND OF THE INVENTION

Service vehicles such as construction plant, agricultural machinery and greenkeeping equipment are typically required to perform an operation (eg excavate a predetermined volume of ground, spray a particular crop field, mow a particular sports field) at a precisely-defined location, and with precisely-controlled operating characteristics such as the direction or speed of travel, the excavation depth, the application rate of sprayed fluid, the cutting height of mower blades etc. Such vehicles may be under the control of a driver who steers the vehicle according to navigation information provided by a positioning system such as GPS. The driver may also operate the service equipment (eg excavator, mower, sprayer) of the vehicle according to operating information provided by a control system. Alternatively, the steering and/or operating control may be performed fully or partially automatically by navigation and control systems on board the vehicle. The degree of automation may be chosen to suit the particular operating requirements of the service vehicle. A robotic mower could be configured to mow and re-mow a particular area of grass fully autonomously, following a predetermined mowing pattern. A crop-spraying tractor, on the other hand, may be steered by a human driver, following guidance information provided by a GPS navigation system, along a pre-planned path defined in the control system for the particular field. The tractor's spraying equipment can be controlled automatically as a function of its GPS location. In this way, the fluid application rate may be varied locally, for example according to known soil characteristics or insect infestation parameters at the particular location in the particular field.

PRIOR ART

It is known to provide service vehicles with GPS-based navigation systems in which the vehicle is configured to follow a predetermined route by using continuously-updated GPS position information from a GPS receiver on board the vehicle. The route may be pre-stored in the navigation system, or it may be calculated based on map data stored in the onboard navigation system. Alternatively, the route information may be downloaded and updated in real time, for example over a cellular wireless network connection. Note that the term route information is used in this description to refer either to a route to be navigated by the vehicle itself, or to a path to be followed by equipment carried on the vehicle. The following description uses the example of a sports field line-marking system to illustrate the principles of the invention. In the particular application of line-marking, the route information typically describes the path of a line to be marked, or it may describe the path (continuous or broken) of a number of lines to be marked, such as the lines of a sports field.

A state-of-the-art line-marking vehicle, such as that described in WO2014013416A1, is capable of operating in a partially autonomous manner, in which the vehicle is steered under manual control of a driver, while a lateral actuator arm moves under automated GPS control to maintain the spray head precisely in the correct lateral position for marking a line defined by a control system. The line definitions of a whole sports field may be downloaded to the control system from a remote database. Payment by means of a credit may be required for downloading the sports field definition, and a usage indicator is subsequently uploaded to the database to confirm that the downloaded line definitions of the sports field have been marked (ie the credit has been spent). The system of WO2014013416A1 can be used to remotely monitor the usage of the downloadable line definitions for sports field markings. However, the discrete per-job nature of the usage information offers only low-resolution management and billing information.

The system of WO2014013416A1 also suffers from a lack of flexibility from the operator's point of view. When a sports field is to be marked out, the operator of the line-marker downloads (and pays for) the predetermined lines of the whole sports field from the remote database. This is acceptable when a sports field is to be freshly marked, because the operator requires the full detail of the positions of the lines in order to perform the task. However, if an operator wishes to re-mark a field, or a part of a field, which has already been marked, he or she may prefer to overmark the line(s) using a standard (ie non-GPS-guided) machine, rather than by downloading (and paying for) the whole sports field definition again. Marking manually is a slower, more error-prone process, than marking with the GPS-controlled spray head, and is carried out without any customisation of the operating parameters (eg fluid application rate) as a function of the spray head's geographical location. So the choice of the operator to mark manually (ie without GPS guidance and/or without the downloaded line definitions of the sports field) results in a slower marking, an inferior quality of marked line and/or a reduced working efficiency. In addition, when the operator marks lines without using the GPS controlled system, the usage data of such marking operations are not recorded in the remote management database.

A similar situation may exist in the remote management of other types of service vehicle. For example, a remotely-managed mower or crop-sprayer may be assigned the task of mowing or spraying a particular field, following a particular GPS-guided mowing or spraying program customised to the particular field. Such arrangements may have similar disadvantages as in the line-marking example described above (lack of flexibility for the operator, low-resolution and incomplete operational data for the remote management system and/or reduced efficiency due to a lack of equipment control information when working without the GPS).

There is thus a need for a service vehicle control system which permits the vehicle operator to make more flexible use of the navigation control information, which permits the remote acquisition of more and higher-resolution usage information, and which increases the operating efficiency of the service vehicle and its equipment.

BRIEF DESCRIPTION OF THE INVENTION

The present invention aims to overcome at least some of the above disadvantages of prior art systems such as those described above. To this end, a service vehicle according to the invention is described in the attached claim 1, and a service vehicle management system according to the invention is described in claim 11. Further variants of the invention are described in the dependent claims.

Thus, a service vehicle according to the invention has an operating mode in which positioning data (eg GPS coordinates), which are provided for guiding the movement of the service vehicle or its equipment, are used for monitoring and reporting the operation of the service equipment to the remote management server, but not for guiding the service vehicle/equipment. This enables the operator of the vehicle to engage the first mode and perform the operation (eg line-marking) without relying on the position information (eg performing the marking manually, as though the GPS were switched off or unavailable), but still retaining the GPS-dependent monitoring and reporting functions, so that the remote management server continues to receive high-resolution, location-dependent operational data, even when the service vehicle is not under GPS guidance. This means that the service operation can still be performed using efficiency improvement instructions received from the remote management server, for example. In the particular example of line-marking, the ability to receive high-resolution, location-dependent operational data, even when the line-marking is being performed manually and without GPS guidance, means that the remote management server can determine a cumulative length of accomplished line-marking, or an amount of marking fluid used, or a measure of efficiency of the line-marking operation. Such parameters can be used for feeding back to the service vehicle as operating change instructions, for improving the performance of the service operation (eg vary the application rate of marking fluid or the speed of the line-marking machine), or they can be used to calculate high-resolution billing information, so that the line-marking operation can be billed per metre, for example, or per litre of marking fluid. According to variants of the invention, the non-guided but monitored mode (the first mode) may be one of several modes which can be selected by the operator and/or by the remote management server. Thus, in the line-marking application, the operator can have the flexibility to choose whether to mark the sports field using GPS guidance of the marking head or to overmark manually, eg using pre-marked lines. The operator can make this choice without affecting whether or not the location-dependent operational data from the line-marking machine is sent to the remote management server.

The invention will be described in detail with reference to the attached drawings, in which.

It should be noted that the figures are provided merely as an aid to understanding the principles underlying the invention, and should not be taken as limiting the scope of protection sought. Where the same reference numbers are used in different figures, these are intended to indicate similar or equivalent features. It should not be assumed, however, that the use of different reference numbers is intended to indicate a difference between the features to which they refer.

DETAILED DESCRIPTION OF THE INVENTION

Figure 1:
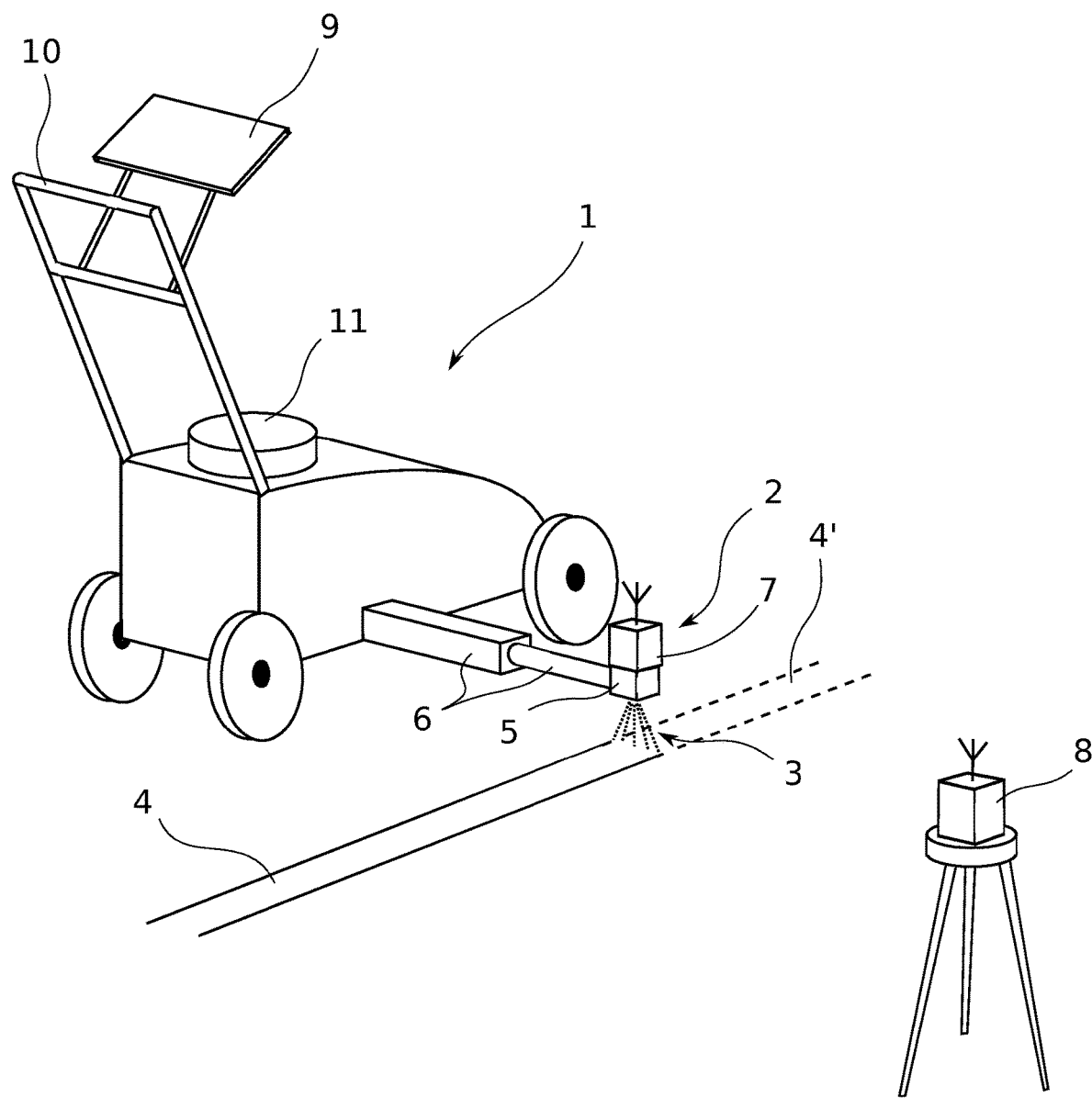
FIG. 1 shows an example of a semi-autonomous service vehicle (in this case a line-marking machine) according to the invention.

An example of a service vehicle according to the invention is illustrated in FIG. 1, which shows a semi-autonomous, GPS-guided line-marking machine 1 fitted with with service equipment 2 comprising a dynamically-extendable lateral actuator arm 6 and a spray head 5 for spaying marking fluid 3 so as to create a mark 4 on a surface in operating area such as an asphalt surface of a car-park or a grass surface of a sports field. The apparatus 1 is designed to be steered by an operator. In this example, the operator would be a pedestrian user walking behind the vehicle and using the handlebars 10 to push and steer the vehicle. In a different example, the apparatus may be a self-propelled (eg battery-driven) ride-on vehicle, in which case the user would only steer the vehicle.

In the example of the semi-autonomous pedestrian line-marking apparatus shown in FIG. 1, the geographical course of the predetermined mark to be sprayed is indicated by reference number 4'. In this example, the mark to be sprayed is illustrated as a straight line, but could alternatively be a different graphical mark such as a circular arc. The planned path of the line to be marked may be defined algorithmically or as a vector function or as a set of data points, for example, in the controller unit 9. The line-marking machine is mounted on wheels and carries marking fluid in tank 11. It can be propelled by the operator using the handlebar 10. A differential arrangement of global navigation satellite system (GNSS) detectors 7 and 8 provides accurate, up-to-date position information of the spray head 5 in the plane of the ground surface. On its own (ie without the possibility to derive differential GNSS data using the second detector 8), the detector 7 may be used to provide coarse positioning information (eg with a precision of about +/−1 m), but the differential GNSS using both detectors is capable of achieving significantly greater accuracy (eg +/−2 cm or better) using differential GPS techniques. The detector 7 is shown mounted with the service equipment 2, so that the detector 7 moves with the service equipment 2 (spray head in this example) when the lateral actuator arm is operated to move the service equipment 2 laterally relative to the body of the line-marking apparatus. In an alternative arrangement, the detector 7 may be mounted on the body of the line-marking apparatus, the actuator 6 may be provided with position encoding means, and control means may be provided for monitoring the lateral extension of the actuator arms (ie the position of the service equipment 2 relative to the detector 7). The lateral position of the service equipment 2 may then be varied in dependence on position data determined by the detector 7, such that the service equipment (spray head) is kept on the path of the line to be marked, even if the line-marking apparatus moves laterally towards or away from the path 4' of the line to be marked.

The control unit 9, which may comprise a portable computing device such as a tablet or a mobile phone, for example, communicates with the service equipment 2. In particular, the control unit 9 can store or obtain information about the operation to be carried out (in this case the coordinates and other parameters of the mark 4' to be sprayed), and communicate these parameters to the service equipment 2 for it to carry out the marking accordingly. Alternatively, the control unit 9 may be configured to calculate more detailed, low level operational instructions from the parameters, for controlling the service equipment 2 to spray the desired mark 4'.

The control unit 9 may, in addition to controlling the service equipment 2, also be configured as a monitoring and reporting means, in that it can acquire position information from the GNSS detectors 7, 8, as well as operational data from line-marking machine 1 and/or the service equipment 2. The operational data may include the application rate of the fluid 3, the speed of movement of the line-marking machine 1 over the ground surface, the vertical height of a part of the service equipment above a reference plane, or the amount of fluid in the tank 11, for example, or data from sensors of the line-marker 1 or the service equipment 2 such as an accelerometer, or sensors for measuring parameters such as temperature, spray line pressure, atmospheric pressure, pump power consumption, ambient light levels or humidity.

This kind of operational data, which may be acquired from one or more such sensors by the control unit 9, is referred to as position-dependent operational data, in that some or all of data may be associated with particular geographical location points of the position information, or in that the operational data may be processed (eg averaged or aggregated) over a particular set of geographical locations in the position information. For example, the control unit 9 may monitor the speed of travel of the line-marking apparatus 1 at different locations. In this case, it may record different speed data at different points along the line to be marked.

In one (GNSS-guided) marking mode, the position information from the position detector 7 is used to control the length of the extendable arm 6, and thereby the position of the spray head 5 relative to the line-marker 1, as the latter proceeds across the operating area (eg car-park or sports field), so as to maintain the spray head 5 in the correct position (as defined in a predetermined marking pattern defined in the control unit 9 and/or downloaded from a backend server, for example) for spraying the line to be marked 4'. This control function is also referred to as guiding the service equipment (spray head 5).

Sensor and other operational data of the marking process can be acquired, for example by the control unit 9, and stored and/or transmitted to a remote (backend) management server (not shown in FIG. 1).

It may happen that the line-marking is to be carried out using a different guiding arrangement for marking the line, (ie other than using the position information from the position detector 7 to guide the spray head 5). An example of such a different guiding arrangement would be using a traditional peg-and-string arrangement as a guide, or by following a previously-marked line by eye, steering the line-marker using the handlebar 10 and with the extendable arm 6 immobilised so that it has a fixed length. Another such different guiding arrangement may involve using a laser guidance system such as the Beamrider™ system, or even a second (eg more precise) GNSS position detector for guiding the spray-head 5, while the (eg less precise) position detector 7 is used for acquiring the position-dependent operational data. This mode of operation, in which the service operation (eg line-marking) is not guided by the positioning system, but the positioning system is nevertheless used to record the position of the apparatus 1 and/or of the service equipment 2 for acquiring the position-dependent operational data, is referred to a non-guided mode.

In both the guided and the non-guided marking modes mentioned above, the (GNSS) position information is used for monitoring and reporting the position-dependent operational data of the marking operation, irrespective of whether the (GNSS) position data is used for guiding the spray head 5.

According to a variant of the invention, more precise positioning data (eg derived using differential GNSS with the two detectors 7 and 8) may be used for the guiding function when the service vehicle 1 or equipment 2 is operated in GNSS-guided mode, but less precise positioning data (for example derived using a non-differential mode with one detector 7) may be used for acquiring the position-dependent operational data which is used for monitoring and reporting. In this way, the monitoring and reporting functions can be performed with relatively modest data processing power if the high-precision (differential) GNSS positioning information is not required for guiding the service vehicle (line marker) 1 or service equipment (spray head) 5, rather than the much greater processing power which is required when high-precision (differential) GNSS positioning information is used for the guiding. In the GNSS-guided mode, the more precise (differential) position data, since it must in any case be acquired for the guiding function, may be used for both the guiding and the monitoring/reporting functions.

Figure 2:
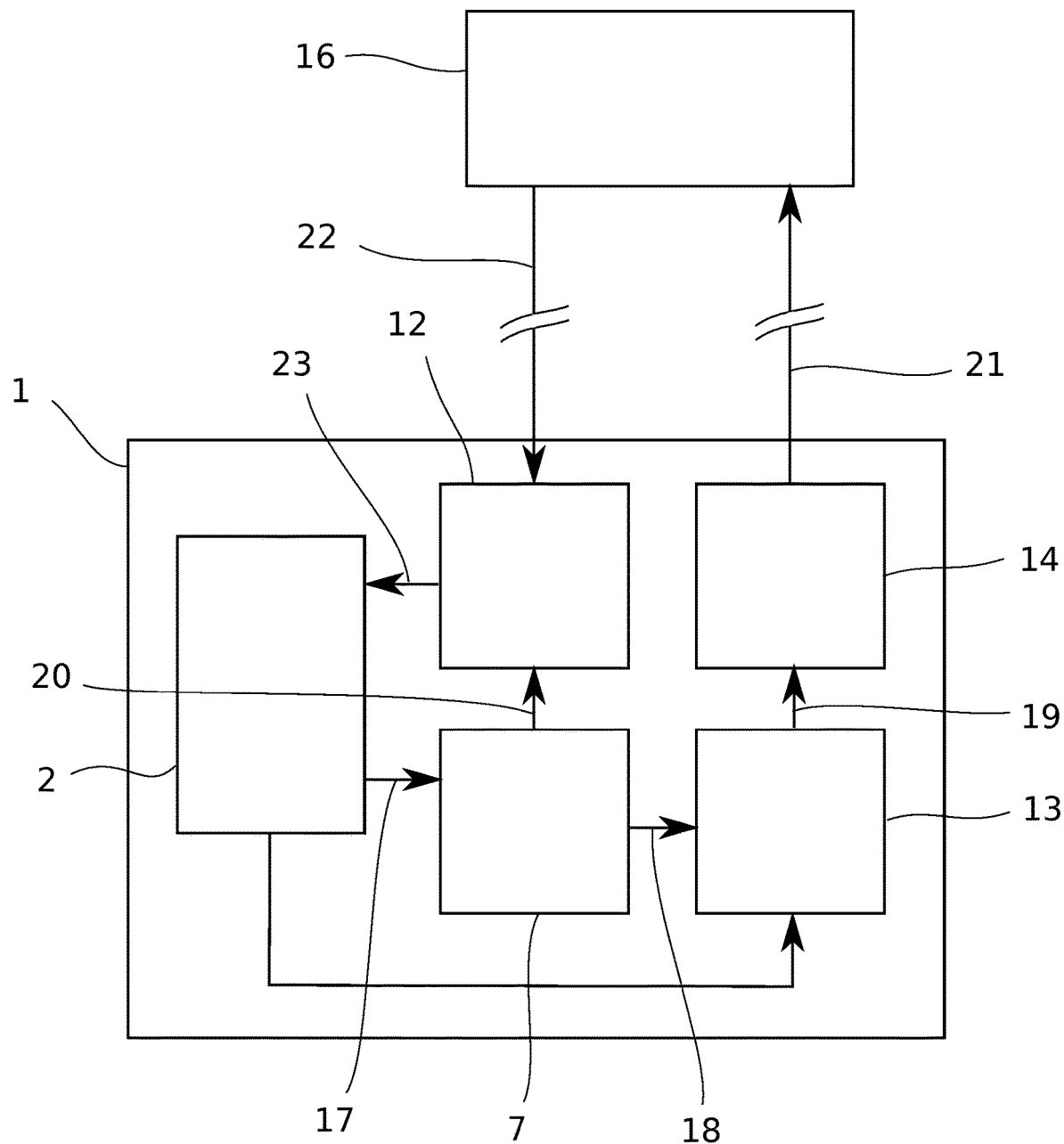
FIG. 2 shows a first example of a management system architecture for the service vehicle of FIG. 1.

FIG. 2 shows a block diagram representing an example of a system for remotely managing the example service vehicle 1 of FIG. 1. A remote (backend) management server 16, which is illustrated as one unit, but may comprise multiple units, communicates 21, 22 with the service vehicle 1. Communication may advantageously be in real-time, by wireless (eg mobile network) connection, for example via wireless internet. Alternatively, as described below, the communication 21, 22 may be carried out via an intermediate client computer (not shown in FIG. 2). The remote management server 16 may be a virtual or cloud server operating at some remote location. The service vehicle 1 is provided with a controller 12 for controlling the operation of the service vehicle 1 and/or the service equipment 2, at least partially under instruction from the remote management server 16, and at least partially using position information from positioning means 7. Monitoring means 13 acquires operational data, for example from sensors provided in or on the service vehicle 1 and/or the service equipment 2. The monitoring means 13 is also configured to acquire, 18, position data from positioning means 7, such that the monitoring means 13 can report, 19, 21, via reporting means 14, position-dependent operational data of the service operation (line-marking) to the remote management server 16. The functions of the controller 12, the monitoring means 13 and/or the reporting means 14 may be implemented as separate devices or subsystems, or algorithmically in the control unit 9 of service vehicle 1, for example.

Remote management server 16 may be configured to provide, 22, operational instructions and parameters for the service activity being carried out. In the case of the line-marker described above, the instructions may comprise the positions, orientations and dimensions of the lines to be marked. Parameters may include information about expected marking fluid application rate, for example, or optimum (lower and upper range of) speed of movement of the vehicle. The controller 12 may control, 23, the lateral position of the service equipment 2 relative to the service vehicle 1 using actuator 6. The controller 12 may also control other operational parameters of the vehicle 1 or the service equipment 2.

The illustrated backend server 16 is also configured to receive, 19, 21, position information from positioning means 7, and/or operational monitoring information of the service vehicle 1 or service equipment 2 from monitoring means 13, via reporting means 14. The server 16 may be configured to store this information and use it for future use and/or for management tasks such as productivity optimisation. The server 16 may be configured (eg programmed) to record operational information at the macro level (eg time taken or amount of paint used, or average travel speed when marking a particular football pitch or set of pitches). Alternatively, or in addition, the server 16 may be configured to record apparatus-level operational information, such as paint flow rate at the spray nozzle, fluid pressure in the marking fluid conduits, battery life, accelerometer data from the actuator arm 6 or the machine body etc.

Figure 3:
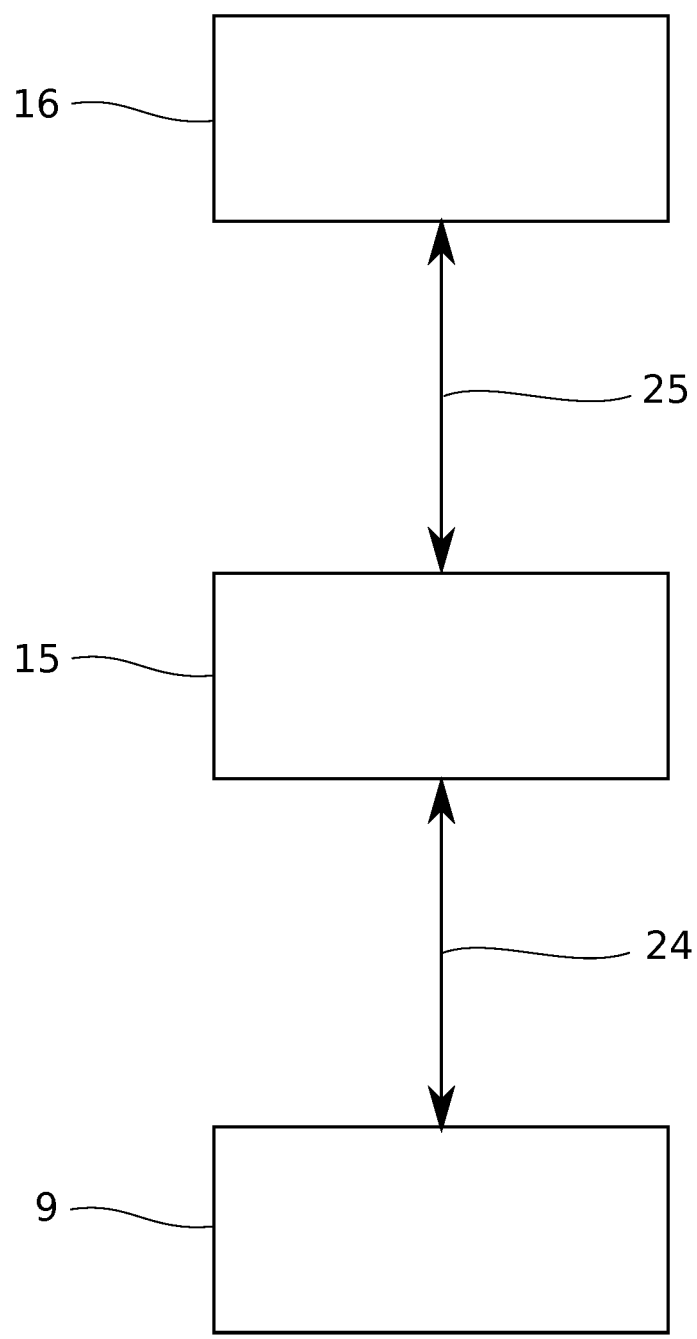
FIG. 3 shows a second example of a system architecture for the service vehicle of FIG. 1.

FIG. 3 illustrates a greatly simplified system structure showing how the control unit 9 of the service vehicle 1 may communicate with the backend management server 16 indirectly, via a client device 15. The backend server 16 may be managed by an equipment supplier, and the client device 15 by an equipment customer and the control unit by an operator of the service vehicle 1. Communication 24, 25 between the backend server 16 and the client device 15, and between the control unit 9 and the client device, may be via wired or wireless connection, for example.

Although the figures only depict one service vehicle 1 and one client device 15, it will be appreciated that the system may comprise multiple service vehicles 1, and may comprise more than one client device 15. The backend server 16 may be managed by an equipment supplier for multiple customers, each with at least one client device 15, and each customer may have multiple service vehicles, each with a control unit 9. The client device 15 and the control units 9 may be configured such that communication 24 only occurs during a limited connection time (eg overnight, or while the service vehicle is not in operation. Tasks (eg marking definitions) can be downloaded to the control unit 9 during this connection time, and position data and performance parameters can be uploaded from the control unit.

The management server 16 may be configured with a management user interface allowing a management user to monitor performance and/or adjust requirements (instructions and/or operational parameters) for the service vehicle 1 to follow. The management server 16 may also be configured to present the management user with information about standardised or historical occurrences of the service activity (eg line-marking) being carried out. It may be configured to accumulate these data for a particular task (eg the marking of a particular pitch or set of pitches) and to accrue a knowledge base of service activity history and/or recorded performance parameters associated with the particular task. The knowledge base may also include estimated, extrapolated or interpolated activity or performance data and/or specification data of the service vehicle or the service equipment 2. The knowledge base may also include parameters or preferences of a particular operator using a particular service vehicle.

The management server may comprise forecasting means for, using data in the knowledge base, predicting future service activity or requirements. For example, when carrying out a particular service task such as marking out a particular set of sports fields, the forecasting means may be configured to automatically calculate an expected battery charge requirement or an amount of paint required for completing the task. If the current battery charge or paint reservoir status parameters, sensed in real time from the service vehicle 1, indicate that the battery charge or paint reservoir status is insufficient for completing the task, the forecasting means may issue a suitable warning to the operator. Thus, if the line-marker is propelled by a battery-powered motor, and the current battery level is detected as being below a required threshold (eg the charge is insufficient for completing the schedule work), then an alert can issued such that corrective action can be taken. The server 16 can automatically send a message to a support service who will deliver a charged battery to site, for example, or, if the management server determines that the work schedule can be completed under different operating conditions, then it sends operation change instructions to the service vehicle (or to a mobile phone of the operator) instructing him or her eg to switch from battery propulsion to manual propulsion for the remainder of the work schedule (or at least until the remaining work can be achieved under battery power. If a small, battery-propelled line-marker is used to mark the asphalt surface of a car-park, then the machine's active range under battery power may be 5 km, for example. When marking the muddy, divot-ridden surface of an amateur sports field, on the other hand, the active range may be greatly reduced (possibly as little as 500 m).

The forecasting means may be implemented at the backend server 16, or at the client device 15 or at the control unit 9, or the forecasting functionality may be distributed among these system elements.

The management system described above permits the operator to identify efficiency improvements which he or she would otherwise be unable to discern. Line-marking traditionally requires skill and experience. An operator may switch spray nozzles, try different paint, in different concentrations, in order to achieve a better mark using less paint. However, the operator was only able to make a highly subjective judgement on the efficiency of the changes he or she had made. At best, the operator could rate himself against own previous markings (quality, speed etc). Using the s according to the invention, the operator can now receive instructions from the remote management server which will help in improving efficiency and performance (eg red warning light indicates that the operator's walking speed is outside the normal range). The operator can now make an informed choice—to mark according to the recommended (efficient) instructions provided by the remote server 16 and displayed on the control unit 9, or to mark according to his or her own preference. For instance, the operator may prefer to mark more slowly than normal (use more paint to mark a brighter line) if he or she is marking a special pitch for a major international sports game. The operator has the flexibility to accept the recommendation of the remote management server (operation change instructions) or not, depending on preference.

In some cases, fresh line-marking may only be carried out once a year, at the beginning of the sports season. In this case, the same line-marking apparatus can be used in different modes, to carry out a fresh marking (using pitch layout data downloaded from last year's first marking) or to carry out a re-marking (following already-marked lines, or using a different guidance system, eg a local laser-based guidance such as the system described in WO2006013386A2.

A marking plan can be input on the control unit 9, which may be a tablet or other mobile device (for example on or at the line-marking machine), or on some other computing device remote from the line-marking machine, such as the client device 15. The plan and details can be then used to mark the pitch. The plan can then be saved in a geographical database, preferably hosted at the backend server, of surface markings for future re-use, with or without subsequent editing.

Similar markings may be used in agriculture, on construction sites, in civil engineering and in archeological exploration. If a contractor is tasked with repairing or replacing a section of pipework which runs under a road, for example, then the contractor must first locate the pipe, as well as any particular obstacles such as buried power or signal cables. Once located, the contractor can mark the road surface to indicate the course of the underground pipe and the positions of the obstacles. A digger then uses the markings to determine where to excavate and where not to excavate in order to avoid the obstacles. The markings can be recorded and uploaded to a database for future use. They can also be catalogued for future use by the same contractor or other interested parties. A library of fields or other geographical features, all identifiable by lines markable on a surface (eg the surface of the ground) can be built up, for example at the backend server, and stored for future use.

I claim:

1. A service vehicle having service equipment for performing a predetermined service operation in an operating area, the service vehicle comprising:
    positioning means adapted to determine position information of at least one of the service vehicle and the service equipment in the operating area;
    monitoring means adapted to acquire position-dependent operational data of the service operation being performed based on the position information; and
    reporting means adapted to communicate the position-dependent operational data to a remote management server,
    wherein the service vehicle is operable in a plurality of operating modes, the plurality of operating modes including a first mode in which the positioning means is configured to provide continuous updated position information to the monitoring means and navigating at least one of the service vehicle and the service equipment is independent of the position information,
    wherein the service vehicle is in communication with a management server configured to remotely manage the service vehicle, the management server comprising receiving means configured to receive the position-dependent operational data from the service vehicle, and analysis means configured to determine a usage parameter of at least one of the service vehicle and the service equipment from the position-dependent operational data,
    wherein the service vehicle includes a line-marking machine and the service equipment includes a marking head for applying a marking fluid, and the position-dependent operational data includes at least one of a speed of the line-marking machine, a distance travelled by the line-marking machine, a rate of application of the marking fluid, and an amount of marking fluid applied, and
    wherein the usage parameter includes at least one of a cumulative distance over which the marking head applies the marking fluid and a cumulative amount of marking fluid applied.

2. The service vehicle according to claim 1, further comprising:
    navigation means for, when active, navigating at least one of the service vehicle and the service equipment in the operation area using the position information; and
    position-dependent controlling means for, when active, controlling an operation of the service equipment that is dependent on the position information when,
    wherein the service vehicle is operable in at least one of a second mode, a third mode, and a fourth mode,
    wherein when the vehicle is in at least one of the second mode, the third mode, and the fourth mode, the positioning means provides continuously updated location information to the monitoring means, the monitoring means acquires the position-dependent operational data using the location information and the reporting means communicates the operational data to the remote management server,
    wherein:
    in the first mode, the position-dependent controlling means is inactive and the navigation means is inactive,
    in the second mode, the position-dependent controlling means is inactive and the navigation means is active,
    in the third mode, the position-dependent controlling means is active and the navigation means is inactive, and
    in the fourth mode, the position-dependent controlling means is active and the navigation means is active.

3. The service vehicle according to claim 2, further comprising selector means for selecting between at least one of the first mode, the second mode, the third mode, and the fourth mode, wherein the selector means is operable by at least one of an operator at the vehicle and under control of the remote management server.

4. The service vehicle according to claim 2, wherein the positioning means are configured to determine a path along which the service vehicle or the service equipment is to be steered in order to perform the predetermined service operation.

5. The service vehicle according to claim 4, wherein the positioning means is configured to receive, from the remote management server, data representing the path.

6. The service vehicle according to claim 1, further comprising operation control update means configured to at least one of receive operating change instructions from the remote management server, indicate the operating change instructions to an operator of the service vehicle, and automatically adjust operating parameters of at least one of the service vehicle and the service equipment according to the operating change instructions.

7. The service vehicle according to claim 6, wherein the operational data comprises at least one of speed data of the service vehicle at a location of the service vehicle, a work rate of the service equipment at a location of the service equipment, cumulative or averaged distance or speed information of the service vehicle, and cumulative or averaged work-rate information of the service equipment.

8. The service vehicle according to claim 7, wherein the operating change instructions comprises instructions to increase or decrease at least one of the speed of the service vehicle and the work rate of the service equipment.

9. The service vehicle according to claim 1, wherein the predetermined service operation is marking of lines of a particular surface, and wherein the operational data are averaged or aggregated over the marking operation of the particular surface.

10. A service vehicle management system comprising:
    a service vehicle having a plurality of operating modes for performing a service operation in an operating area, the service vehicle comprising:
        a detector configured to determine position information of the service vehicle in the operating area, and
        a control unit configured to acquire and monitor at least one of the position information from the detector and position-dependent operational data of the service vehicle; and
    a management server for remotely managing the service vehicle, the management server configured to receive at least one of the position information and the position-dependent operational data from the control unit, determine a usage parameter of the service vehicle based on at least one of the position information and the position-dependent operational data;
wherein the position-dependent operational data includes at least one of a speed of the service vehicle, a distance travelled by the service vehicle, a rate of application of a marking fluid of the service vehicle, and an amount of marking fluid applied, and
the usage parameter includes at least one of a cumulative distance over which the service vehicle applies the marking fluid and a cumulative amount of marking fluid applied.

11. The service vehicle management system according to claim 10, further comprising: billing means configured to determine a billable cost based on the usage parameter.

12. The service vehicle management system according to claim 10, wherein the management server is configured to:
store predetermined reference performance data of the service operation;
compare the operational data with the predetermined reference performance data;
generate optimised operational data based on the operational data received from the service vehicle;
generate operating change instructions based on the optimised operational data; and
communicate the operating change instructions to the service vehicle.

13. The service vehicle management system according to claim 10, further comprising:
a controller having an active state and an inactive state, in the active mode, the controller is configured to control an operation of the service vehicle based on at least one of the position information and the position-dependent operational data of the service vehicle; and
a navigator having an active mode and an inactive mode, in the active mode, the navigator is configured to guide the service vehicle based on at least one of the position information and the position-dependent operational data of the service vehicle,
wherein the plurality of operating modes includes:
a first mode in which the controller is in the inactive state and the navigator is in the inactive mode,
a second mode in which the controller is in the inactive state and the navigator is in the active mode,
a third mode in which the controller is in the active state and the navigator is in the inactive mode, and
a fourth mode in which the controller is in the active state and the navigator is in the active mode.

14. The service vehicle according to claim 1, further comprising billing means configured to determine a billable cost based on the usage parameter.

15. The service vehicle according to claim 1, further comprising:
storage means configured to store predetermined reference performance data of the service operation;
analysis means configured to compare the operational data with the reference performance data;
means for generating optimised operational data based on the location-specific operational data received from the service vehicle;
means for generating operating change instructions based on the received operational data and the optimised operational data; and
means for communicating the operating change instructions to the service vehicle.

* * * * *